Patented Jan. 26, 1954

2,667,468

UNITED STATES PATENT OFFICE 2,667,468

MAKING POLYSULFONAMIDES FROM BIS-SULFONYL CHLORIDE AND DIAMINE SALT IN PRESENCE OF WATER AND WATER-IMMISCIBLE SOLVENT

Wilford Donald Jones and Samuel B. McFarlane, Summit, N. J., assignors to Celanese Corporation of America, New York, N. Y., a corporation of Delaware No Drawing. Application August 31, 1950, Serial No. 182,616

8 Claims. (Cl. 260—79.3)

This invention relates to the production of linear polysulfonamides and relates more particularly to a novel process for the production of linear filament-forming polysulfonamides by the reaction of a polyamine and a bis-sulfonyl chloride.

An object of this invention is the provision of an improved process for the production of linear polysulfonamides.

Another object of this invention is the production of linear polysulfonamides which are adapted to form filamentary materials and which are capable of being molded when subjected to suitable shaping operations.

A further object of this invention is the provision of an improved process for the oxidation of aliphatic dithiols to the corresponding aliphatic disulfonic acids from which disulfonic acids the bis-sulfonyl chlorides may be obtained.

Other objects of this invention will appear from the following detailed description.

Numerous attempts have been made to prepare linear filament-forming polysulfonamides by reacting a diamine with a bis-sulfonyl chloride under various polymer-forming reaction conditions. As far as is known, these attempts have been unsuccessful and unmodified polysulfonamides having filament-forming properties have not been obtained.

We have now found that polysulfonamides having filament-forming properties and capable of being molded by suitable shaping operations may be obtained by the reaction of a diamine with a bis-sulfonyl chloride wherein the reaction medium employed comprises a mixture of said polymer-forming reactants, the diamine being employed in aqueous solution and the bis-sulfonyl chloride in solution in a water-immiscible organic solvent. Most advantageously, the desired polymerization reaction is effected by dissolving an acid salt of the diamine in water, adding a solution of the bis-sulfonyl chloride in an inert, water-immiscible organic solvent to the aqueous amine solution with strong agitation, and then forming an emulsion of said solutions by continuing the stirring while adding a suitable emulsifying agent. With continued stirring, the amine acid salt is then neutralized by slowly adding an alkaline neutralizing agent to the emulsion. The release of the free amine in this manner enables the latter to react immediately with the bis-sulfonyl chloride and to form the desired polysulfonamide. The addition of the alkaline neutralizing agent is continued until an amount at least sufficient to neutralize all of the amine acid salt has been added and all of the amine has been made available for reaction. Stirring at high speed is continued after all of the alkaline neutralizing agent has been added to ensure completion of the reaction, and the solid polymer is then filtered from the liquid phase and dried.

The polymerization reaction is preferably carried out at a relatively low temperature. The aqueous amine solution and bis-sulfonyl chloride solution are each cooled to a temperature of about 0 to 20° C. before being mixed, and while being reacted, the temperature of the reaction mixture is preferably maintained at from 0 to about 5° C.

The aqueous solution of diamine employed preferably contains from 0.1 to 1.0 mol of the diamine per liter of solution while the water-immiscible organic solvent solution of the bis-sulfonyl chloride should contain, preferably, from 0.1 to 1.0 mol of the bis-sulfonyl chloride for each liter of solution employed. As suitable water-immiscible organic solvents which may be employed for dissolving the bis-sulfonyl chloride, there may be mentioned benzene, toluene and xylene. The mineral spirits or hydrocarbon mixture of aromatics, paraffins and naphthalenes sold under the name of "Varsol" are also suitable. Preferably, however, we employ toluene, since optimum results are obtained by the use thereof.

During the emulsion polymerization reaction whereby the poly-sulfonamides are obtained, hydrochloric acid is formed as a by-product and the alkaline neutralizing agent which is added to yield the free diamine from the diamine acid salt acts as an acid binding agent. Preferably, the alkaline neutralizing agent is added in excess so that it not only acts to release the diamine for polymerization but it will also be present in an amount sufficient to neutralize completely all of the by-product hydrochloric acid which is formed during the polymerization. An excess of up to about 5% may be employed satisfactorily. Examples of alkaline neutralizing agents which we may employ are sodium carbonate, disodium phosphate, sodium hydroxide and trisodium phosphate. Excess diamine may also be employed as the acid binding agent.

Emulsifying agents of different types may be employed in emulsifying the aqueous solution of amine acid salt and the organic solution of the bis-sulfonyl chloride. Among the suitable emulsifying agents which may be employed there may be mentioned long chain alcohol sulfates such as sodium lauryl sulfate or sodium oleyl sulfate, ethylene oxide condensates with long chain fatty alcohols, esters of sodium sulfosuccinic acid, e. g. the dioctyl ester, long chain fatty acid esters of polyethylene glycol, ethylene oxide condensates with castor oil, long chain monoglycerides, alkyl aryl polyether alcohols, i. e. the reaction product of ethylene oxide and xylenol, sorbitan monolaurate or the condensation product of sorbitan monolaurate with ethylene oxide, mono- or polyalkyl naphthalene sulfonates, sulfates of fatty acid mono-glycerides or the glycol esters of long chain fatty acids. Emulsifying agents of the class of sodium-N-substituted-$\beta$-amino-ethane sulfonates are particularly suitable in the production of polysulfonamides in acordance with our novel process. For the production of polymers of good color, it is important that the emulsifying agent be as free as possible of colored bodies as the polymer tends to scavenge colored bodies from the emulsifying agent and the reaction mixture.

Optimum results are obtained when the emulsifying agent is employed in an amount of from 0.1 to 1.0% based on the weight of water.

Examples of amines which may be employed in forming polysulfonamides in accordance with the novel emulsion polymerization process of our invention are diamines such as ethylene diamine, trimethylene diamine, tetramethylene diamine, pentamethylene diamine, hexamethylene diamine, ortho-, meta- or para-phenylene diamine, cyclohexylene diamine, nuclearly substituted-phenylenediamines and nuclearly substituted cyclohexylenediamines. N - alkyl-substituted diamines which contain a free amino hydrogen are also suitable.

Other diamines which may also be employed are, for example, $\alpha,\omega$-alkane-bis-($\omega$-amino alkyl) ethers, such as 1,4-tetramethylene-bis-($\gamma$-amino propyl) ether, bis-($\omega$-amino-alkyl) ethers such as 3,3' - diamino-di-propyl-ether, 4,4'-diamino-dicyclohexyl methane, bis-($\omega$-amino-alkyl) sulfides such as bis-(2-amino-ethyl)-sulfide, 1,2-, 1,3- or 1,4-$\alpha,\alpha'$-diamino xylene or other $\omega,\omega'$-diamino dialkyl benzene, diamino-naphthalene, diamino-biphenyl, $\omega,\omega'$-diamino dialkyl biphenyls, $\omega$-amino - alkyl - anilines, $\omega$-amino-alkyl cyclohexylamines, bis-($\omega$-amino-alkoxy) benzene, bis-($\omega$-amino - alkoxy) cyclohexane, 4,4'-diamino-dicyclohexyl sulfones, $\omega,\omega'$-sulfonyl-bis-alkyl amines, diamino diphenyl sulfones, diamino benzophenones and N,N'-bis($\omega$-amino-alkyl)-$\alpha,\omega$-alkane disulfonamides. Amines containing both primary and secondary amino groups such as diethylene triamine or triethylene tetramine, for example, yield branch chain polysulfonamides. Such polymers, if they contain moderately branched chains, are of relatively low melting point. If the chains are highly branched the polymers approach and may even reach substantial infusibility.

The bis-sulfonyl chlorides which we employ in the production of said polysulfonamides may be obtained conveniently by oxidizing a suitable dithiol with hydrogen peroxide to form a disulfonic acid and then reacting the sodium salt of the disulfonic acid with phosphorus pentachloride. Hydrogen chloride and phosphorus oxychloride are formed as by-products. The hydrogen chloride is first removed by heating the reaction mixture over steam. The phosphorus oxychloride present is then removed by distilling the reaction mixture under reduced pressure. The bis-sulfonyl chloride is separated from the remainder of the reaction mixture by extracting the later with a suitable solvent, such as chloroform. The volume of the chloroform extract obtained is reduced by evaporation and, after the addition of a neutral petroleum fraction, e. g. octane, the bis-sulfonyl chloride is crystallized from the solvent mixture.

The oxidation of the dithiol to the corresponding disulfonic acid is effected, as indicated above, employing hydrogen peroxide as the oxidizing agent. Preferably, the hydrogen peroxide is employed in glacial acetic acid solution and the dithiol added to the glacial acetic acid solution of hydrogen peroxide at a rate which enables the temperature of the reaction mixture to be held at from 80 to 115° C. The hydrogen peroxide is added to glacial acetic acid as a 30 to 90% by weight aqueous solution, the amount added being in stoichiometric excess of the amount required to effect the oxidation of the particular dithiol of the desired disulfonic acid. The hydrogen peroxide is employed in an excess of from about 5 to 100%. The excess hydrogen peroxide remaining when the oxidation is completed is destroyed. The water and acetic acid are removed by distillation under vacuum and whatever hydrogen peroxide still remains is destroyed with the aid of aqueous formaldehyde. Further distillation under vacuum removes any remaining volatiles. The disulfonic acid present is neutralized by the addition thereto of an alkaline neutralizing agent, such as sodium carbonate, and the solution then evaporated to dryness to recover the disulfonic acid. High yields of the disulfonic acid are obtained by our improved oxidation process. The disulfonic acid may then be readily converted to the bis-sulfonyl chloride by reaction with phosphorus pentachloride.

Examples of bis-sulfonyl chlorides which we may employ are tetramethylene bis-sulfonyl chloride, pentamethylene bis-sulfonyl chloride, ethane-1,2 bis-sulfonyl chloride, methane-1,1-bis - sulfonyl chloride, ethane - 1,1 - bis - sulfonyl chloride, propane-1,3-bis-sulfonyl chloride, propane-1,1-bis-sulfonyl chloride, decane-1,10-bis-sulfonyl chloride, cyclohexane-1,4-(1,3 or -1,2- or 1,1) bis-sulfonyl chloride, pentane-1,5- (1,4; 1,3 or 1,2) bis-sulfonyl chloride, benzene-1,4 (1,2 or 1,3) bis-sulfonyl chloride, diphenyl-4,4'-bis-sulfonyl chloride, toluene-1',1'-bis-sulfonyl chloride, toluene-4,1'-bis-sulfonyl chloride, 3-oxapentane-1,5-bis-sulfonyl chloride $$(ClO_2S-CH_2-CH_2-OCH_2-CH_2-SO_2Cl)$$

3 - thiapentane - 1,5 - bis - sulfonyl chloride, 3,3 - dioxo - 3 - thiapentane - 1,5 - bis - sulfonyl chloride $(ClO_2S-(CH_2)_2-SO_2-(CH_2)_2-SO_2Cl)$.

In order further to illustrate our invention but without being limited thereto, the following examples are given:

*Example I*

164 parts by weight of tetramethylene diamine are dissolved in 10,000 parts by weight of water and the amine is then converted to the acid salt by being neutralized with concentrated hydrochloric acid to the Congo red end point. 500 parts by weight of pentamethylene bis-sulfonyl chloride are dissolved in about 17,500 parts by weight of toluene to form a separate solution. The two solutions are then combined with strong agitation and 13 parts by weight of the sodium salt of N-lauroyl, N-butyl-$\beta$-amino-ethane sulfonic acid in 200 parts water are then added so that an emulsion of the solution is formed. The temperature of the emulsion is maintained at about 40° C. To the emulsion is now gradually added about 2400 parts by weight of a 3.2N aqueous solution of sodium hydroxide. Stirring is continued during the addition and the rate at which the solution is added is such that the addition is completed after about ½ hour. Stirring is continued further for an additional ¼ hour and the precipitated polysulfonamide is then filtered from solution. The product, comprising poly - N,N' - tetramethylene - 1,5 - pentane - bis - sulfonamide, is washed alternately with water and acetone employing strong agitation. The polysulfonamide obtained has a melting point of 150–160° C. and the melt may be drawn into short fibers.

Example II 164 parts by weight of tetramethylene diamine are dissolved in 17,000 parts by weight of water and neutralized to the Congo red end point with concentrated hydrochloric acid and cooled to 0° C. 500 parts by weight of pentamethylene bis-sulfonyl chloride are dissolved in about 9500 parts by weight of toluene and the two solutions combined with strong agitation while cooling to hold the temperature at about 0° C. To the mixture is added 35 parts by weight of the sodium salt of N-lauroyl-N-butyl-β-amino-ethane sulfonic acid in 500 parts by weight of water and, with continued stirring, a smooth emulsion is obtained. About 2400 parts by weight of 3.2N aqueous sodium hydroxide solution are gradually added with stirring while maintaining the temperature at 1 to 2° C. The pH of the solution rises rapidly from an original value of 4 to a value of over 10. Stirring is continued for about ½ hour after the sodium hydroxide has been added and the polysulfonamide polymer formed is filtered off. The polymer comprises poly-N,N'-tetramethylene - 1,5 - pentane - bis - sulfonamide. The polymer is washed with water, then with acetone and again with water and finally dried. The polymer melts at 148–163° C. and the melt may be drawn into short fibers.

Example III 328 parts by weight of tetramethylene diamine are dissolved in 5000 parts by weight of water and 500 parts by weight of pentamethylene bis-sulfonyl chloride are dissolved in 30,000 parts by weight of chloroform. The solutions obtained are then mixed with strong agitation for ½ hour at a temperature of about 20° C. by external cooling. A polymer precipitates from the liquid and is then filtered off. When melted and heated gently the polymer increases in melt viscosity and long fibers may be drawn from the melt, the fibers exhibiting an appreciable cold draw. The polymer is soluble in concentrated sulfuric acid from which it can be recovered by dilution. The polymer is also soluble in 20% aqueous sodium hydroxide and may be recovered upon acidification of the sodium hydroxide solution.

Example IV

The oxidation of the dithiol to the corresponding disulfonic acid, the intermediate for the preparation of the bis-sulfonyl chloride, is effected in the following manner:

205 parts by weight of aqueous 50% hydrogen peroxide and 205 parts by weight of glacial acetic acid are placed in a reaction vessel and then 34.5 parts by weight of pentamethylene dithiol are slowly added thereto with stirring, while maintaining the reaction mixture at a temperature of 115° C. The hydrogen peroxide is 100% in excess of that theoretically required to oxidize the dithiol to the disulfonic acid. When the addition is completed, stirring is continued for 1½ hours while maintaining the temperature at 95° C. by heating over steam. 0.5 part by weight of manganese dioxide is then added to decompose the excess hydrogen peroxide, the reaction being aided by the addition of 0.2 part by weight of platinized charcoal, which acts as a catalyst for the peroxide decomposition. The same temperature is maintained for one hour with stirring to complete the decomposition of the hydrogen peroxide as far as possible. After removal of the water and remaining acetic acid by distillation under vacuum, the decomposition is finally completed by adding 5 parts by weight of aqueous 40% formaldehyde to the mixture. The distillation to remove water and other volatiles is completed by distilling at about 25 mm. pressure.

The concentrated solution is neutralized with aqueous 1 M. sodium carbonate solution and then evaporated to dryness. The theoretical yield of sodium 1,5-pentamethylene disulfonic acid is obtained.

Example V

About 300 parts by weight of glacial acetic acid are placed in a reaction vessel and 150 parts by weight of 90% aqueous hydrogen peroxide are added thereto. 68.2 parts by weight of pentamethylene dithiol are slowly added to the glacial acetic acid solution of hydrogen peroxide over the course of 1.5 hours while stirring and cooling to maintain the reaction temperature below about 115° C. Upon completing the addition of the pentamethylene dithiol the reaction mixture is heated for one hour over steam. The excess hydrogen peroxide present is destroyed by heating and stirring the reaction mixture with 0.5 part by weight of platinized charcoal. The destruction of the hydrogen peroxide is completed by adding 0.5 part by weight of manganese dioxide and further heating and stirring for one hour. The water and acetic acid are distilled off at 0.5 mm. pressure leaving the desired pentamethylene disulfonic acid which is obtained in a yield of 100% of theory.

The term "acid salt of tetramethylene diamine" as employed in the claims is to be construed as meaning a salt of the diamine with an acid wherein the said salt is acidic in character.

It is to be understood that the foregoing detailed description is given merely by way of illustration and that many variations may be made therein without departing from the spirit of our invention.

Having described our invention, what we desire to secure by Letters Patent is:

1. Process for the production of poly-N,N'-tetramethylene - 1,5 - pentane - bis - sulfonamide, which comprises agitating an aqueous solution of an acid salt of tetramethylene diamine and a solution of pentamethylene bis-sulfonyl chloride in chloroform, said solutions being free from other polymerizable materials, adding an alkaline neutralizing agent to the mixture of said solutions during the agitation thereof to neutralize the tetramethylene diamine and to release the free diamine and separating the polysulfonamide polymer therefrom.

2. Process for the production of poly-N,N'-tetramethylene - 1,5 - pentane - bis - sulfonamide, which comprises mixing an aqueous solution of an acid salt of tetramethylene diamine with a solution of pentamethylene bis-sulfonyl chloride in a water-immiscible organic solvent, said solutions being free from other polymerizable materials, adding an emulsifying agent and forming an emulsion, adding an alkaline neutralizing agent to the emulsion while agitating to free the tetramethylene diamine, and separating the polysulfonamide formed from the liquid phase.

3. Process for the production of poly-N,N'-tetramethylene - 1,5 - pentane - bis - sulfonamide, which comprises mixing an aqueous solution of an acid salt of tetramethylene diamine with a solution of pentamethylene bis-sulfonyl chloride in toluene, said solutions being free from other polymerizable materials, adding an emulsifying agent and forming an emulsion, adding an alkaline neutralizing agent to the emulsion while agitating to free the tetramethylene diamine, and separating the polysulfonamide formed from the liquid phase.

4. Process for the production of poly-N,N'-tetramethylene - 1,5 - pentane - bis - sulfonamide, which comprises mixing an aqueous solution of an acid salt of tetramethylene diamine with a solution of pentamethylene bis-sulfonyl chloride in toluene, said solutions being free from other polymerizable materials, adding an emulsifying agent and forming an emulsion, adding an aqueous solution of sodium hydroxide to the emulsion while agitating to free the tetramethylene diamine, and separating the polysulfonamide formed from the liquid phase.

5. Process for the production of poly-N,N'-tetramethylene - 1,5 - pentane - bis - sulfonamides, which comprises mixing an aqueous solution of an acid salt of tetramethylene diamine with a solution of pentamethylene bis-sulfonyl chloride in toluene, adding an emulsifying agent comprising the sodium salt of N-lauroyl, N-butyl-β-amino-ethane sulfonic acid and forming an emulsion, adding an aqueous solution of sodium hydroxide to the emulsion while agitating to free the tetramethylene diamine, and separating the polysulfonamide formed from the liquid phase.

6. Process for the production of polysulfonamides, which comprises agitating an aqueous solution of an acid salt of a diamine, containing free amino hydrogen on each of the amino nitrogens and having not less than two carbon atoms in a chain separating the amino nitrogens, with a solution of a bis-sulfonyl chloride, containing not less than two carbon atoms in a chain separating the sulfonyl chloride groups, in a water-immiscible organic solvent, said solutions being free from other polymerizable materials, continuing the agitation while adding an alkaline neutralizing agent to the emulsion to neutralize the diamine acid salt and release the free diamine, and separating a polysulfonamide from the liquid phase.

7. Process for the production of polysulfonamides, which comprises agitating an aqueous solution of an acid salt of a diamine, containing free amino hydrogen on each of the amino nitrogens and having not less than two carbon atoms in a chain separating the amino nitrogens, with a solution of a bis-sulfonyl chloride, containing not less than two carbon atoms in a chain separating the sulfonyl chloride groups, in a water-immiscible organic solvent, said solutions being free from other polymerizable materials, in the presence of an emulsifying agent whereby the mixture is emulsified, continuing the agitation while adding an alkaline neutralizing agent to the emulsion to neutralize the diamine acid salt and release the free diamine, and separating a polysulfonamide from the liquid phase.

8. Process for the production of poly-N,N'-tetramethylene - 1,5 - pentane - bis - sulfonamide, which comprises agitating an aqueous solution of an acid salt of tetramethylene diamine and a solution of pentamethylene-bis-sulfonyl chloride in a water-immiscible organic solvent, said solutions being free from other polymerizable materials, adding an alkaline neutralizing agent to the mixture of said solutions during the agitation thereof to neutralize the tetramethylene diamine and to release the free diamine and separating the polysulfonamide polymer therefrom.

WILFORD DONALD JONES.
SAMUEL B. McFARLANE.

References Cited in the file of this patent
UNITED STATES PATENTS

| Number | Name | Date |
|---|---|---|
| 2,040,626 | Nicodemus et al. | May 12, 1936 |
| 2,201,884 | Carothers | May 21, 1940 |
| 2,225,266 | Frey et al. | Dec. 17, 1940 |
| 2,269,997 | Berchet | Jan. 13, 1942 |
| 2,321,890 | Berchet | June 15, 1943 |
| 2,321,891 | Berchet | June 15, 1943 |
| 2,338,830 | Werntz | Jan. 11, 1944 |
| 2,505,910 | Proell et al. | Mar. 2, 1950 |

FOREIGN PATENTS

| Number | Country | Date |
|---|---|---|
| 69,210 | Norway | Apr. 30, 1945 |
| 865,455 | France | May 24, 1941 |
| 892,361 | France | Apr. 5, 1944 |
| 895,395 | France | Apr. 3, 1944 |
| 903,983 | France | Oct. 23, 1945 |

OTHER REFERENCES

Webster's New International Dictionary, 2nd ed.; Merriam Co., 1939, p. 29, item "acid salt," definition (b).